Nov. 13, 1951  J. E. MENRATH  2,575,283
JAR AND JACKET THEREFOR
Filed April 4, 1949
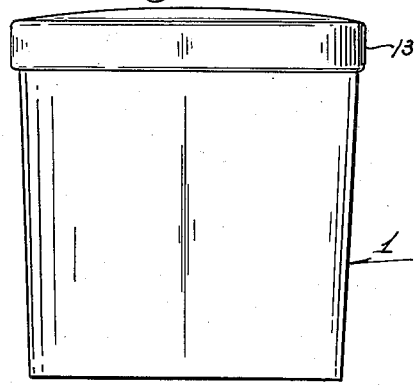
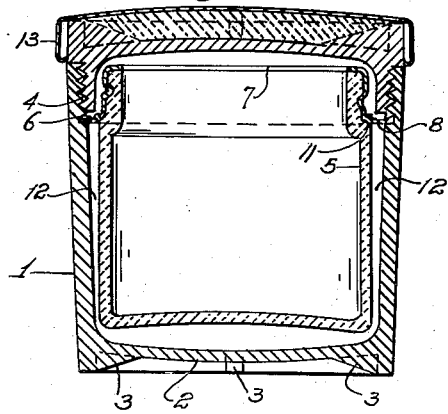
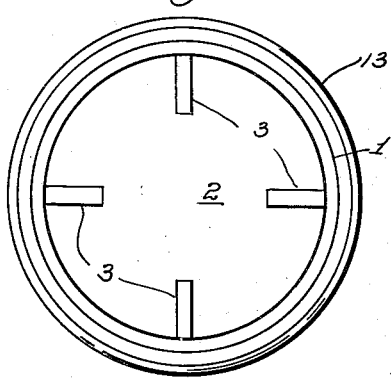
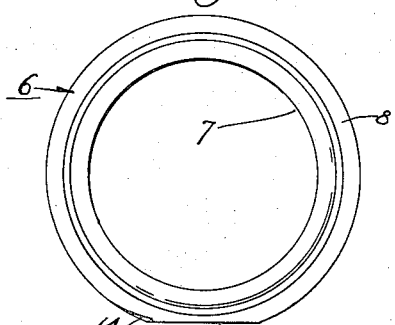
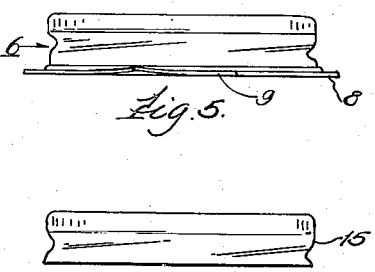
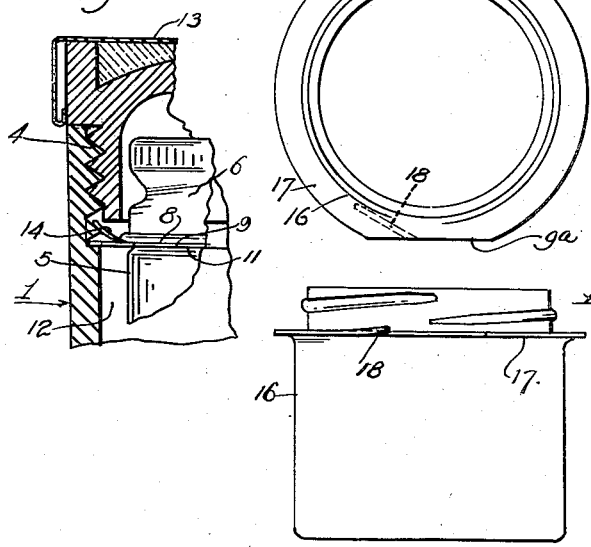
Inventor:
Joseph E. Menrath
by H. J. Sanders
Attorney.

Patented Nov. 13, 1951

2,575,283

UNITED STATES PATENT OFFICE 2,575,283

JAR AND JACKET THEREFOR

Joseph E. Menrath, Chicago, Ill.

Application April 4, 1949, Serial No. 85,403

1 Claim. (Cl. 215—12)

This invention relates to containers and more particularly to jars intended primarily for containing cosmetic preparations such as salves, ointments, cold creams and other preparations of paste-like consistency, also including powders, liquids of a volatile nature such as aromatic chemicals and perfume oils and radium isotopes. Conventional jars for preparations of this character have heretofore been made of medium or the heavy opal-type glass, while some have been made out of plastics.

One object of the invention is to provide an inner supply jar or re-fill, made either of a thin wall glass or molded from material of the synthetic resin class, and used as a one-way jar that can be substituted for the conventional jar, and having means for releasably locking the outer and inner jar members together.

In accordance with the present invention I provide two jars, one an attractive outside container, a thing of beauty that may be always retained and kept the same as the hair brush and comb on milady's dresser, minus all commercial advertising matter; and an inside supply jar, a one-way jar that carries the material or product and that is thrown away when empty and is thereafter replaced by another supply jar containing the material or product.

In use the very attractive container holds the supply jar. The consumer removes the cap or cover of the outside container, exposing the supply jar, the latter having a removable cap which is then discarded, so that the consumer may readily reach the contents of the supply jar with one or two fingers. This is the most popular type as it is readily opened to expose the contents of the supply jar and as readily closed.

In ordinary cosmetic jars the contents may crack, break or spoil as a result of excessive heat or cold, whereas in this assembly the contents of the supply jar are suspended in a vacuum or dead air space which acts as insulation, protecting and preserving the product in its original condition.

In the case of liquids such as aromatic chemicals or perfume oils this assembly protects the product against light, temperature changes and evaporation because of the airtight triple seal—vacuum, suspension and insulation. The foregoing applies also to drugs and pharmaceuticals such as powders, liquids and pastes. In the case of radioactive isotopes an additional protection is added by means of a lead lining between the outside container jar and the inside supply jar affording protection against dangers of radioactive radiations.

Today plastics are accepted without question, even without conscious recognition on the part of the consumer as the only material for a great many uses. The outside container jar of my invention is made of phenolic resins having an unusual combination of physical properties—dielectric strength, self insulation, light weight, impact strength, heat, acid, alkali, water resistance, machineability, smooth glossy finish, color, and the ability of this phenolic material to be molded to close tolerances, so that all component parts will operate without slipping or jamming, or slipping after assembly. Improved molding techniques have produced a smooth streamline appearance that is comfortable to the hand.

The dollar value, generally speaking, of a product is a limiting factor in the choice of packaging and it is not advisable to spend a quarter of a dollar to box an item that sells for a dime. However, the adoption of a package with intrinsic value possibilities for re-use and sales appeal has pushed back the cost barrier to permit the use of finer designs and better materials. The five basic factors involved in the design and production of my invention, of package or assembly, are protection, convenience, economy, sales appeal and re-use, and when considering the cost factor with that of the conventional glass opal jar with its fancy label and commercial advertisement, name or brand marking on its face, which after the use of its contents is discarder because of its resemblance to a tin can, is a gross and economic waste.

Whereas in the case of my container and assembly invention, a thing of luxurious, beautiful color harmony, warmth of touch, simple old world design, gives this unusual container the quality and appearance of old jade, fine ivory, or jet black ebony, capped with a thin shell of metal resembling old gold or burnished gold. It is the combination of outside and inside container that makes this assembly a real economy, the outside container a possession to treasure made of the strongest and most durable plastic materials which because of its simple designs lends itself to mass production at or lower cost than the conventional opal jar. This invention affords a substantial saving to the consumer and a continuous repeat business to the manufacturer on refills, supplied at a fair and reasonable profit, in spite of or due to the use of quality materials and products furnished.

In the accompanying drawing I have shown embodiments of the invention by way of illustration but not intended to define or limit the scope of the same as the claim forming part of this specification serves that purpose.

In the drawing:

Fig. 1 is a view in elevation of a jar according to the invention.

Fig. 2 is an approximately central vertical sectional view through the jar disclosing outer and inner members.

Fig. 3 is an inverted plan view of the jar shown in Figs. 1 and 2.

Fig. 4 is a plan view of a flanged cap forming part of the invention.

Fig. 5 is a view of the cap of Fig. 4 in elevation

Fig. 6 is an enlarged fragmentary sectional view of the jar showing the locking feature.

Fig. 7 is a plan view of a modified form of the inner member.

Fig. 8 is an elevational view of the supply jar of Fig. 7, and,

Fig. 9 is an elevational view of a conventional type of jar cap.

The reference numeral 1 denotes the side wall of the outer member or container jar having the bottom 2 with ornamental feet 3, the inner face of the wall 1 being formed at or near its upper terminus with the screw threads 4. Referring now to all figures except Figs. 7 and 8 an inner jar member 5 of lesser diameter in its round neck and body portion and of lesser depth than the member 1 is formed upon the exterior face of its neck portion with a screw thread to mesh with the interior complementarily threaded face of the adapter cap 6 having a perforation 7 of substantially the same diameter as the mouth of the inner jar member, said cap having an outwardly disposed terminal flange 8 sheared peripherally throughout a short portion of its circumference to form the chord 9 desirably parallel to a cap diameter, said flange being of a diameter to peripherally engage the threads 4 of the member 1 so that when the cap is threaded upon the jar member 5 until it rests upon the shoulder 11 of the jar defined by the juncture of its neck and body portions the cap with jar 5 attached may be screwed into the jar member 1 until the flange periphery contiguous to the cord 9 engages with the final convolution of the thread 4 and is there bent upwardly slightly at 14 and becomes releasably locked in frictional engagement therewith as clearly shown in Fig. 6.

The jar member 5 is now firmly but releasably locked in innermost telescoped engagement with and in spaced relation to the jar member 1, a dead air space 12 separating the jar members. The cover 13, of the outer jar member 1, formed with screw threads complementary to the threads 4 may now be screwed into position in conventional manner and the jar assembly is compact, free from vibration of its parts and the contents of the inner jar member 5 insulated against temperature changes, from external impact and the like. The first inner jar member 5 to be received within the jar member 1 may carry the adapter cap 6 but when this first jar member 5 is empty and is to be removed and discarded the adapter cap after removal from the jar member 5 is left within the jar member 1 and the next inner jar member 5 with a new supply of the product is shipped to the consumer with an ordinary or conventional jar cap 15 which is discarded at the time the new jar member 5 is put in position. When the cover 13 is removed the contents of the new jar member 5 are now accessible to the user.

Referring now to Figs. 7 and 8 a plastic inner jar member 16 is used instead of the inner jar member 5. The jar member 16 is formed with a flange 17 identical with the flange 8 at the juncture of the neck and body portions of the jar, except that this flange may be provided with a slot 18 indicated in dotted lines, this slot for locking engagement with the innermost screw thread 4 of the jar member 1, the slot 18 extending obliquely from the chord 9a inwardly.

What is claimed is:

As an article of manufacture, an outer jar threaded interiorly at its upper end, a cover for said outer jar formed with screw threads complementary to, but lesser in number than, the threads of said outer jar so that with said cover received the maximum distance within said outer jar said cover is spaced from the final convolution of said outer jar thread, an inner jar having an exteriorly threaded neck portion defining a shoulder with its body portion, and a flanged adapter cap, said adapter cap threaded for engagement with the threads of said inner jar, the flange of said adapter cap sheared peripherally for easy application to the thread of said outer jar, said flange contiguous to said sheared portion bent upwardly for easily releasable locking engagement with said final thread convolution in one position of said cap.

JOSEPH E. MENRATH.

REFERENCES CITED

The following references are of record in the file of this patent:

UNITED STATES PATENTS

| Number | Name | Date |
|---|---|---|
| 1,965,028 | Bissell | July 3, 1934 |
| 2,196,486 | Anderson | Apr. 9, 1940 |
| 2,203,880 | Schindelbeck | June 11, 1940 |
| 2,285,614 | Rodgers, Jr., et al. | June 9, 1942 |
| 2,413,726 | Morrison | Jan. 7, 1947 |

FOREIGN PATENTS

| Number | Country | Date |
|---|---|---|
| 404,315 | Great Britain | Jan. 8, 1934 |